US012639023B2

(12) United States Patent
Da Silva

(10) Patent No.: US 12,639,023 B2
(45) Date of Patent: May 26, 2026

(54) DISPLAY SYSTEM FOR MOTOR VEHICLE PASSENGER COMPARTMENT, ASSOCIATED DISPLAY METHOD, AND ASSOCIATED COMPUTER-READABLE MEDIUM

(71) Applicant: Faurecia Clarion Electronics Europe, Paris (FR)

(72) Inventor: Edouard Da Silva, Herblay (FR)

(73) Assignee: Faurecia Clarion Electronics Europe, Paris (FR)

( * ) Notice: Subject to any disclaimer, the term of this patent is extended or adjusted under 35 U.S.C. 154(b) by 0 days.

(21) Appl. No.: 18/545,881

(22) Filed: Dec. 19, 2023

(65) Prior Publication Data

US 2024/0201928 A1     Jun. 20, 2024

(30) Foreign Application Priority Data

Dec. 19, 2022    (FR) ...................................... 22 13756

(51) Int. Cl.
*G06F 3/14*          (2006.01)
*G06F 3/01*          (2006.01)
(Continued)

(52) U.S. Cl.
CPC ............ *G06F 3/1446* (2013.01); *G06F 3/013* (2013.01); *G06T 3/40* (2013.01); *G06T 7/11* (2017.01);
(Continued)

(58) Field of Classification Search
CPC ......... G06F 3/1446; G06F 3/013; G06T 3/40; G06T 7/11; G06T 2207/20021;
(Continued)

(56) References Cited

U.S. PATENT DOCUMENTS

| | | | |
|---|---|---|---|
| 9,547,172 B2 * | 1/2017 | Remillard | .............. G02B 27/01 |
| 10,528,132 B1 * | 1/2020 | Hassani | ................ G06F 3/1423 |

(Continued)

FOREIGN PATENT DOCUMENTS

| | | |
|---|---|---|
| EP | 2541209 A1 | 1/2013 |
| JP | 2020112667 A | 7/2020 |

OTHER PUBLICATIONS

French Search Report corresponding to application FR2213756, dated Nov. 15, 2023, 2 pages.

*Primary Examiner* — Bryan Earles
(74) *Attorney, Agent, or Firm* — Reising Ethington P.C.

(57) ABSTRACT

A display system having a programmable electronic device configured to execute, at a given rate: a module for receiving a number P greater than 1 of digital images to be displayed at a given instant, the P digital images to be displayed being provided by at least two distinct sources, a module for combining the P digital images to be displayed at the given instant into a single full digital image, in the case where the number N of activatable display surfaces is greater than 1, a module for dividing the full digital image into a number less than or equal to N of digital sub-images to be displayed, each of the digital sub-images to be displayed being intended to be displayed on a corresponding activatable display surface, and a module for controlling the display of each of the digital sub-images on the corresponding activatable display surface.

12 Claims, 3 Drawing Sheets

(51) Int. Cl.

| | |
|---|---|
| *G06T 3/40* | (2024.01) |
| *G06T 7/11* | (2017.01) |
| *G06V 20/70* | (2022.01) |
| *G09G 3/34* | (2006.01) |

(52) U.S. Cl.
CPC .......... *G06V 20/70* (2022.01); *G09G 3/3406* (2013.01); *G06T 2207/20021* (2013.01); *G06T 2207/20212* (2013.01); *G06T 2207/30268* (2013.01); *G09G 2300/026* (2013.01); *G09G 2320/0686* (2013.01); *G09G 2340/0407* (2013.01); *G09G 2354/00* (2013.01); *G09G 2380/10* (2013.01)

(58) Field of Classification Search
CPC .......... G06T 2207/20212; G06T 2207/30268; G06V 20/70; G09G 3/3406; G09G 2300/026; G09G 2320/0686; G09G 2340/0407; G09G 2354/00; G09G 2380/10; G09G 5/14; G09G 2340/0464; G09G 3/20; G09G 3/36; B60K 35/29; B60K 2360/149; B60K 2360/1523; B60K 2360/191; B60K 2360/349; B60K 35/22; B60K 35/10; B60K 35/00; G02F 1/133601; B60W 50/14; B60W 2050/146
See application file for complete search history.

(56) References Cited

U.S. PATENT DOCUMENTS

| | | | | |
|---|---|---|---|---|
| 11,705,078 | B1 * | 7/2023 | Chung ..................... | G09G 5/10 |
| | | | | 345/204 |
| 12,197,806 | B2 * | 1/2025 | Kakuta .................... | G09G 5/14 |
| 2008/0259209 | A1 * | 10/2008 | Houlgate ........... | H04N 21/4622 |
| | | | | 348/E7.004 |
| 2014/0152433 | A1 * | 6/2014 | Sugiyama .............. | B60K 35/22 |
| | | | | 340/438 |
| 2016/0196805 | A1 * | 7/2016 | Chen ..................... | G06F 3/1446 |
| | | | | 345/667 |
| 2017/0253122 | A1 * | 9/2017 | Jun .......................... | G06T 11/60 |
| 2018/0011675 | A1 * | 1/2018 | Athreya ............... | G06F 3/1454 |
| 2023/0262863 | A1 * | 8/2023 | Aliakseyeu ........... | H05B 45/20 |
| | | | | 315/294 |

* cited by examiner

DISPLAY SYSTEM FOR MOTOR VEHICLE PASSENGER COMPARTMENT, ASSOCIATED DISPLAY METHOD, AND ASSOCIATED COMPUTER-READABLE MEDIUM

TECHNICAL FIELD

The present invention relates to a display system for a passenger compartment of a motor vehicle, an associated display method and an associated computer program.

The invention lies within the field of systems for displaying content, for example, information and images/videos, on a display surface of a motor vehicle passenger compartment.

BACKGROUND

Today, motor vehicles are equipped with numerous sensors (cameras, radars) and a sophisticated on-board system, in particular comprising one or more information display surfaces, but also images or videos comprising a succession of images, in particular transmitted by the on-board sensors.

The display surfaces are composed, according to the scenarios, of liquid crystal display (LCD) surfaces, and surfaces integrated into a trim element of the vehicle, and back-lit by controllable lighting units, for example light-emitting diode (LED) arrays.

The on-board system comprises at least one central control unit (or ECU) configured to control what is displayed on the available display surfaces.

The number of sources of content to be displayed is likely to vary and increase, depending on the various options of the vehicles; in particular, the number of on-board sensors and information to be displayed provided by the central control unit is variable.

To display as much of the available content as possible, it would be necessary to provide a very extended display surface, for example an LCD screen having a very large liquid crystal display surface. However, this type of screen is expensive, and a constant display on such a screen also consumes a large amount of electrical energy.

There is therefore a need to propose a display solution adaptable as a function of the number of sources and the number of display surfaces, which is more economical and/or less electrical energy-consuming.

SUMMARY

According to one aspect, the invention proposes a display system for a passenger compartment of a motor vehicle, comprising a number N of activatable display surfaces, each display surface being activatable by a lighting control of at least one associated lighting unit, and a programmable electronic device configured to control a display on each display surface, the programmable electronic device comprising a processor configured to execute, at a given rate:

a module for receiving a number P greater than 1 of digital images to be displayed at a given instant, said P digital images to be displayed being provided by at least two distinct sources, a module for combining the P digital images to be displayed at the given instant into a single full digital image, in the case where the number N of activatable display surfaces is greater than 1, a module for dividing said full digital image into a number less than or equal to N of digital sub-images to be displayed, each of the digital sub-images to be displayed being intended to be displayed on a corresponding activatable display surface, a module for controlling the display of each of the digital sub-images on the corresponding activatable display surface.

Advantageously, the proposed display system implements a combination of the digital images received from a plurality of sources into a full digital image, which then makes it possible to adapt to any number N of display surfaces.

The display system may also have one or more of the features hereunder, taken independently or according to all technically conceivable combinations.

It further comprises a unit for detecting a direction of the gaze of a user present in the passenger compartment of the motor vehicle, the processor being further configured to, depending on the direction of the gaze of the user, implement a module for determining a main display area or a main display surface.

The processor is configured to control an increase in illumination of said main display area or surface and a decrease in illumination of the other display areas or surfaces.

The processor is configured to implement processing for changing the dimensions and/or resolution of digital images, in order to form a full digital image with predetermined dimensions and resolution.

The processor is configured to implement an image analysis in the module for dividing into digital sub-images.

The analysis of images is semantic analysis for determining at least one low-entropy area, the dividing being carried out in said low-entropy area.

In the case where the number N of activatable display surfaces is equal to 1, the control module is configured to control the display of the full digital image on the display surface.

According to another aspect, the invention relates to a display method for a passenger compartment of a motor vehicle, implemented by a processor of a programmable electronic device of a display system for a motor vehicle passenger compartment, comprising a number N of activatable display surfaces, each display surface being activatable by a lighting control of at least one associated lighting unit. This method of the steps, repeated at a given rate, comprising:

receiving a number P greater than 1 of digital images to be displayed at a given instant, said digital images to be displayed being provided by at least two distinct sources, combining the P digital images to be displayed at the given instant into a single full digital image, in the case where the number N of activatable display surfaces is greater than 1, dividing said full digital image into a number less than or equal to N of digital sub-images to be displayed, each of the digital sub-images to be displayed being intended to be displayed on a corresponding activatable display surface, controlling the display of each of the digital sub-images on the corresponding activatable display surface.

The method may further comprise obtaining a direction of the gaze of a user present in the passenger compartment of the motor vehicle, determining a main display area or a main display surface based on the direction of the user's gaze, and adjusting the illumination of said main display area or surface.

The advantages of the display method are similar to the advantages of the display system recalled hereinbefore.

According to another aspect, the invention relates to a non-transitory computer-readable medium comprising program code instructions which, when executed by a programmable electronic device, implements the display method of the preceding paragraphs.

BRIEF DESCRIPTION OF THE DRAWINGS

Other features and advantages of the invention will become apparent from the description given hereunder, by way of non-limiting indication, referring to the appended figures, among which.

DETAILED DESCRIPTION

Figure 1:
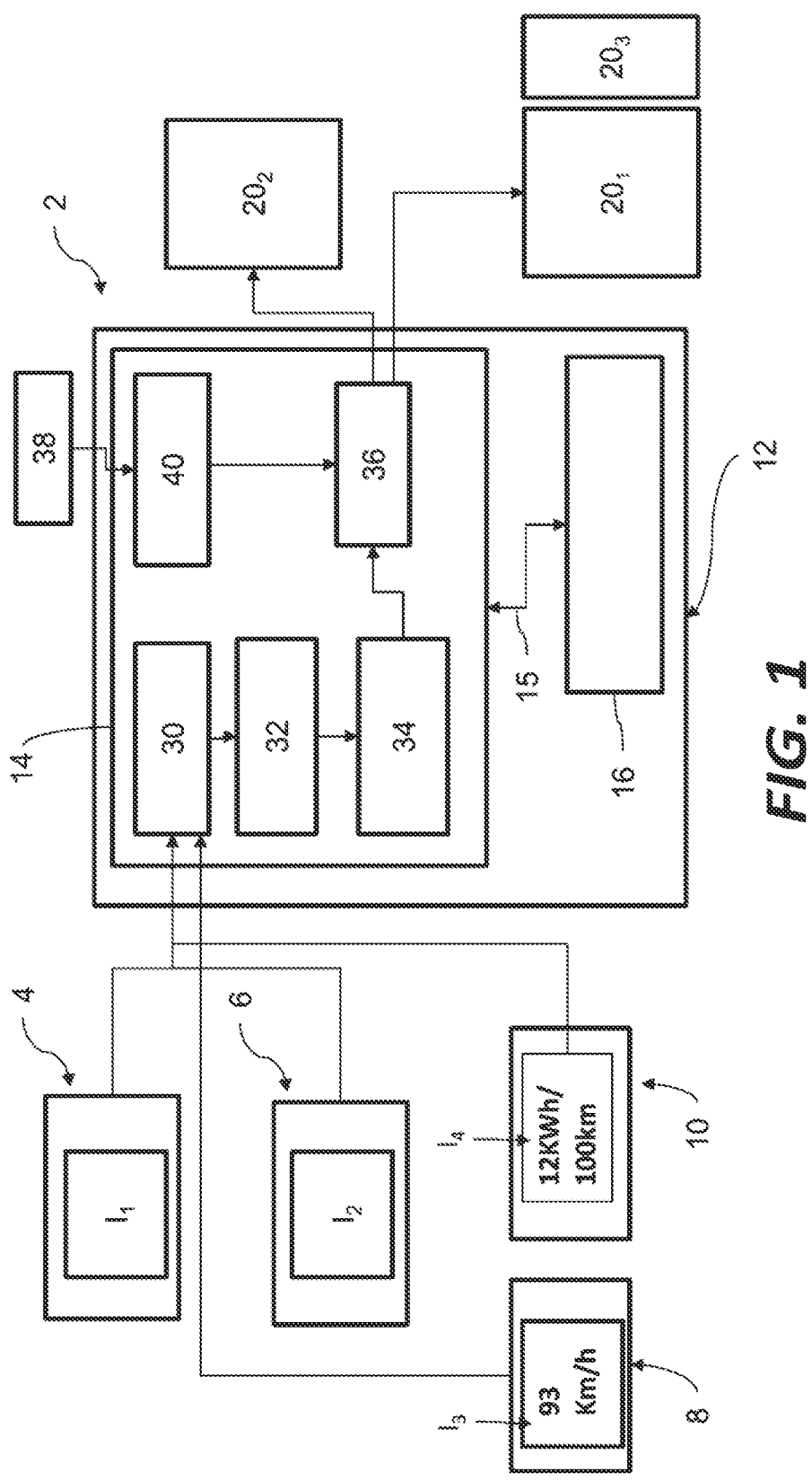
FIG. 1 schematically shows an image display system in a passenger compartment of a motor vehicle according to one embodiment.

FIG. 1 schematically shows an image display system 2, in a motor vehicle passenger compartment (not shown).

The system 2 comprises a plurality of image sources to be displayed, the sources being respectively on-board sensors and/or one or more electronic control units providing information relating to the vehicle, for example the speed, the interior temperature of the passenger compartment, the outside temperature, etc.

In the example shown, digital image sensors of the embedded camera 4, 6 type are considered, respectively providing digital images $I_1$, $I_2$ corresponding to the side mirrors of the vehicle, and other on-board sensors providing information to be displayed, to computing units 8, 10 which digitize the information to form digital images $I_3$, $I_4$.

As a simple non-limiting example, image $I_3$ contains vehicle speed information, and image $I_4$ electrical power consumption information for an electric vehicle.

The sets of digital images $I_1$, $I_2$, $I_3$, $I_4$ form content to be displayed.

Each digital image is represented by a pixel array, also called image data, defined by its respective dimensions, which are a number of rows and a number of columns.

The images to be displayed are provided at a given rate, corresponding to the display refresh frequency to be applied.

In the case where the image sensors and other content provider equipment have distinct refresh frequencies of their own, a display rate is chosen.

For example, the display rate corresponds to the highest frequency among the sequences of images (or videos) received, for example 60 frames per second (Fps), if a first video to be displayed comprises 60 frames per second and a second video to be displayed comprises 30 frames per second (Fps). The system 2 further comprises a programmable electronic device 12, for example an on-board computer, comprising a computing processor 14 and an electronic memory unit 16, connected by a communication bus 15.

The programmable electronic device 12 may comprise other elements, in particular communication interfaces with the on-board equipment, which are not shown here.

The on-board system further comprises N activatable display surfaces 20.

For example N=3 in FIG. 1, and the display surfaces are respectively referenced $20_1$, $20_2$, and $20_3$, for example two surfaces $20_1$, $20_2$ of LCD screens and a peripheral display surface $20_3$, adjoining a lateral edge of the display surface $20_1$. For example, the peripheral display surface $20_3$ is back-lit by lighting units forming a sheet of light-emitting diodes (or LEDs).

Such a back-lit display surface makes it possible to produce an extended display surface at lower cost.

The programmable electronic device 12 is configured to execute:

a module 30 for receiving a number P greater than 1 of digital images to be displayed at a given instant, said digital images to be displayed being provided by at least two distinct sources, a module 32 for combining the P digital images to be displayed at the given instant into a single full digital image, a module 34 for dividing said full digital image into a number less than or equal to N of digital sub-images to be displayed, each of the digital sub-images to be displayed being intended to be displayed on one of the activatable display surfaces, implemented in the case where the number N of activatable display surfaces is greater than 1;

a module 36 for controlling the display of each of the digital sub-images on the corresponding activatable display surface.

The term digital sub-image refers to a digital image, formed by a pixel array divided from the full digital image. In other words, a digital sub-image is also a digital image.

Furthermore, the system 2 comprises a unit 38 for detecting a direction of the gaze of a user present in the passenger compartment of the motor vehicle, typically of the driver of the vehicle, which is configured to detect a gaze direction sustained for a predetermined time period, for example on the order of one millisecond.

The programmable electronic device 12 is configured to execute a module 40 for determining a main display area or a main display surface and adjust the illumination (or brightness) of said main display area or surface.

The term display area is used herein to designate a portion of a display surface, having a smaller area than the display surface in which it is comprised.

In certain embodiments, the display of such a display area can be controlled, in particular in terms of illumination/contrast separately, that is it is possible to increase or decrease the illumination in such a display area without applying the same increase or decrease across the entire display surface.

Then the control module 36 is configured to adjust the illumination according to the main display area or main display surface determined, for example to increase the illumination of said main display area or surface and to decrease the illumination of the other areas and/or display surfaces.

The combination module 32 is in particular configured to implement digital image processing, for example processing of changing dimensions and/or resolution of digital images.

The dividing module 34 is configured to implement a semantic image analysis enabling adequate dividing of the full digital image into N sub-images.

For example, the dividing is carried out in low-entropy image areas detected by semantic analysis of a chosen number of consecutive images, for example 20 consecutive images. A low-entropy area is for example defined by a number of columns of contiguous pixels with fixed values or the deviation of which is less than a given threshold between two successive images.

In one embodiment, the modules 30, 32, 34, 36 and 40 are made in the form of software instructions forming a computer program, which, when executed by a computer, implements a display method according to an aspect of the invention.

The computer program comprising software instructions is furthermore able to be recorded on a non-transitory computer-readable medium. The computer-readable medium is for example a medium able to store the electronic instructions and to be coupled to a bus of a computer system. As an example, the readable medium is an optical disc, a magneto-optical disc, a ROM memory, a RAM memory, any type of non-volatile memory (for example EPROM, EEPROM, FLASH, NVRAM), a magnetic card or an optical card.

In a variant not shown, the modules 30, 32, 34, 36 and 40 are each made in the form of programmable logic components, such as FPGAs (Field-Programmable Gate Arrays), microprocessors, GPGPU components (General-Purpose Processing on Graphics Processing), or dedicated integrated circuits, such as ASICs (Application-Specific Integrated Circuits).

Figure 2:
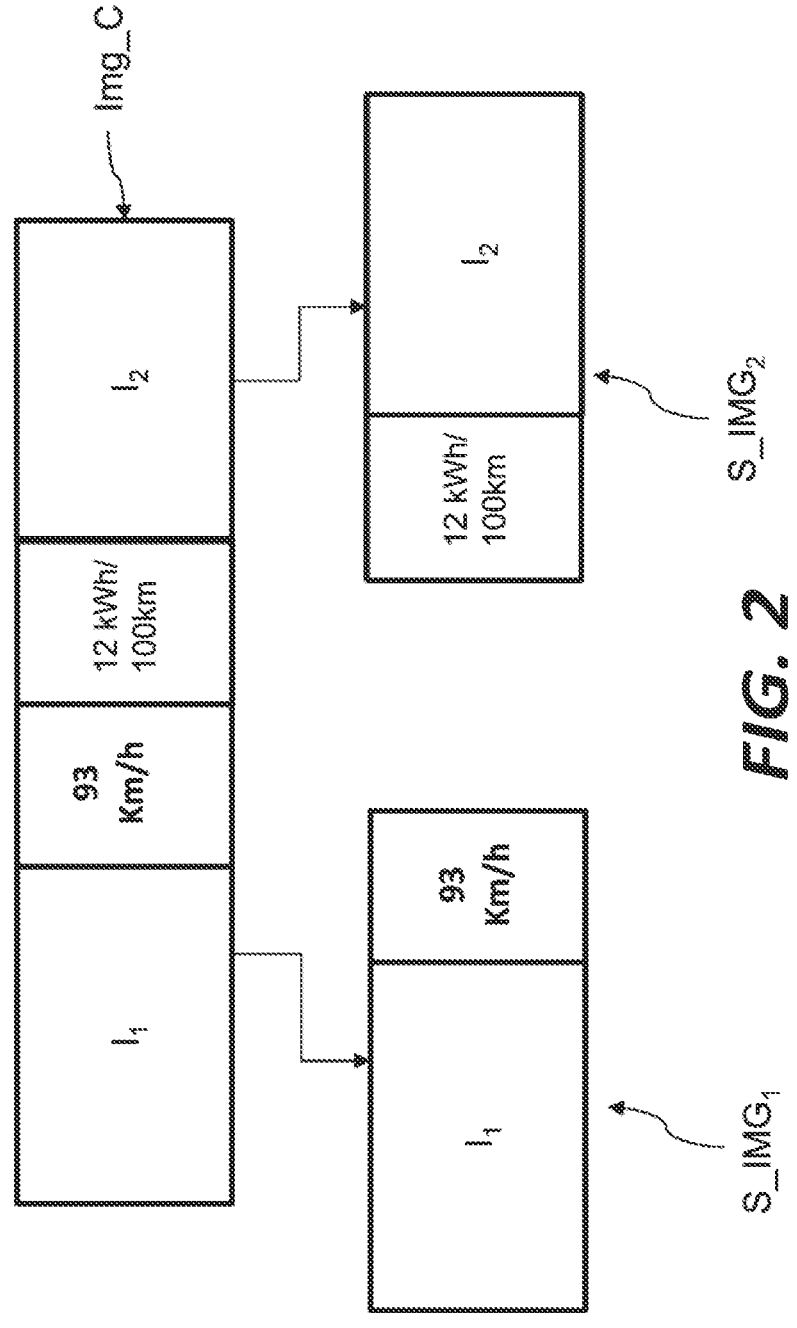
FIG. 2 is a schematic example of a full digital image and sub-images obtained after dividing the full digital image.

FIG. 2 schematically shows an example of a full digital image Img_C obtained by combining images $I_1$, $I_2$, $I_3$, and $I_4$, and sub-images $S\_IMG_1$, and $S\_IMG_2$ obtained by dividing the full digital image, for their display respectively on the display surfaces $20_1$ and $20_2$.

Thus, in this schematic example, the four initial digital images are combined into a single full digital image, the combination consisting of concatenating the images, in a rectangular image comprising L rows and C columns.

The digital images to be displayed are, where appropriate, processed, for example by enlarging or decreasing, in particular to obtain the number of pixel lines desired per image.

For example, techniques for changing the resolution/size of images ("scaling"), storing images in a buffer, and synchronization between images in order to perform a display whose lossiness is imperceptible to a user ("seamless") are applied. Such techniques are known to the person skilled in the art.

The splitting into two sub-images is advantageously carried out according to the initial digital images and available display surfaces.

Figure 3:
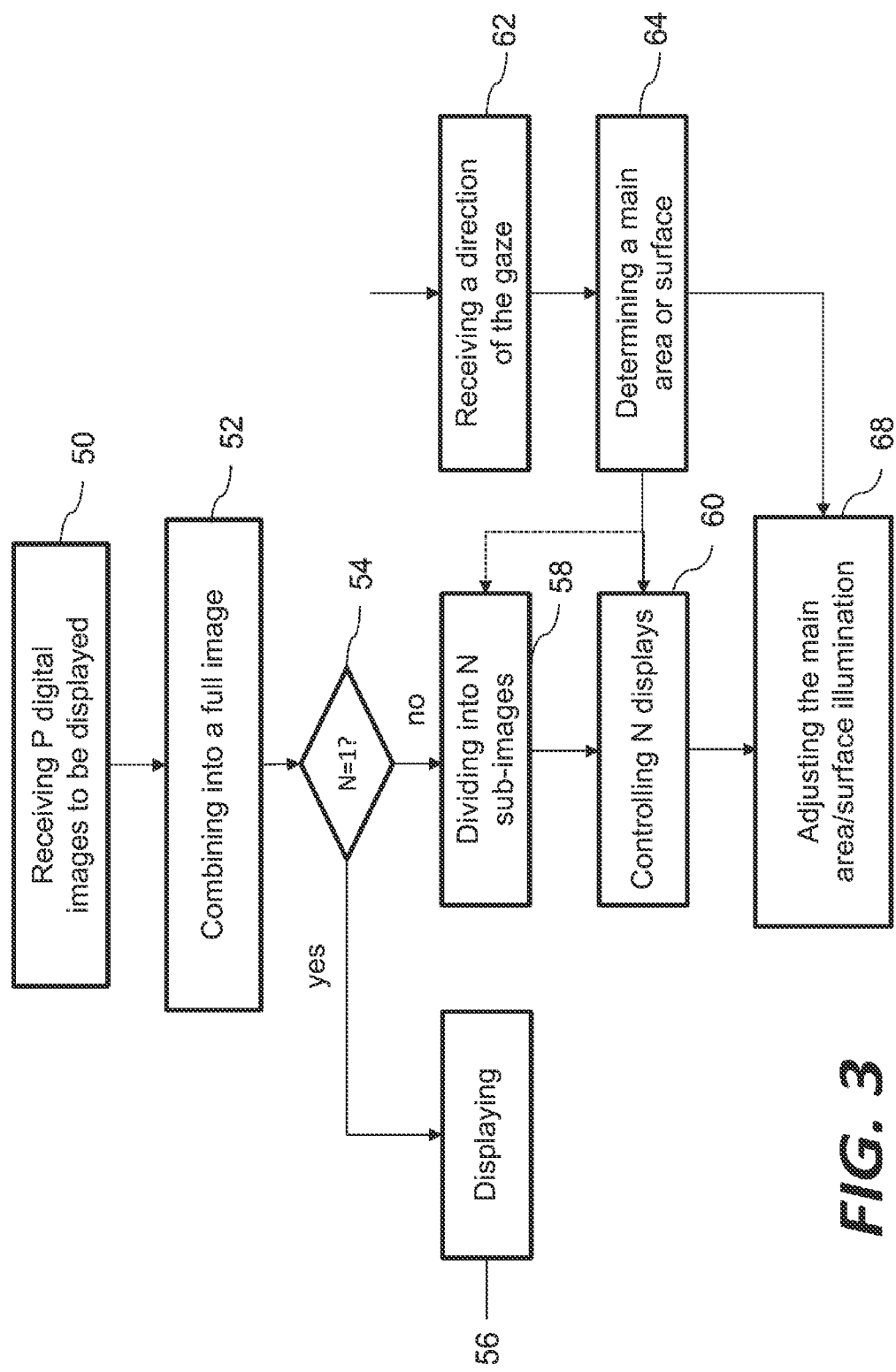
FIG. 3 is a block diagram of the main steps of a display method according to one embodiment.

FIG. 3 is a flowchart of the main steps of an image display method according to one embodiment.

The method comprises a step 50 of receiving the P digital images to be displayed at a given moment in time, $I_1$ to $I_P$.

The number P of digital images can vary over time, but it is fixed at a given iteration of the method.

The digital images to be displayed are for example derived from different sources, and the image $I_k$ has respective dimensions of $I_k$ rows and $C_k$ columns.

The method then comprises a step of combining 52 the P digital images to be displayed, $I_1$ to $I_P$, into a single full digital image Img_C.

For example, the digital images to be concatenated are analyzed, and a ratio of change of size/resolution of images is determined, then applied.

The concatenation order is for example a predefined order, depending on the sources of the digital images.

If the number of display surfaces N is strictly equal to 1 (condition 54=True), the method then comprises a display 56 of the full digital image on the display surface. If necessary, the image resolution is updated for compatibility with the display surface.

If the number of display surfaces N is strictly greater than 1 (condition 54=False), the method comprises a step 58 of dividing the full digital image into N sub-images.

In one embodiment, in addition to the number of available display surfaces, the dimension (for example, the area available for the display) or the resolution of each of the available display surfaces is taken into consideration in this dividing step.

In one variant, the full digital image is divided into N digital sub-images of identical dimensions (in terms of the number of rows and columns of pixels).

In another variant, the subdivision uses semantic analysis of the content so as to avoid a subdivision that would make it harder for the user to understand.

The N digital sub-images obtained are then displayed on the N display surfaces in step 60, for example by applying a command of the backlighting units of these surfaces as a function of the pixels of the digital sub-images to be displayed.

In one embodiment, the method further comprises a step 62 of obtaining a direction of gaze of a designated user of the vehicle, for example of the driver.

This step 62 is carried out continuously, in parallel with the other steps.

The method then comprises determining 64 a main display area or surface based on the determined gaze direction. For example, the main display surface is the display surface intersected by the direction of gaze, or a zone of chosen dimensions centered on the direction is chosen as a main display area.

The main display area or surface obtained in step 64 is then used in a step 68 of adjusting the illumination of the main display area or surface.

For example, the illumination of the main area or surface is increased, and additionally, the illumination of the other display surfaces is reduced.

Advantageously, this makes it possible to improve the visibility of the user while optimizing the amount of electrical energy consumed.

The adjustment of the lighting may for example be carried out by controlling the backlighting units of these display surfaces.

The steps of the method are repeated at a given rate, which is the display rate.

The display method was described hereinbefore for dividing the single full image into N sub-images, N being the number of available surfaces.

According to one variant, a number M of display surfaces less than N is chosen for the actual display, in which case a division into M<N digital sub-images is performed. The display is then carried out on the M display surfaces selected. Of course, the number M can vary over time.

Advantageously, the proposed system and method allow easy adaptation to any number of image sources and display surfaces, thus making it possible to use a plurality of "small" display surfaces instead of a "large" display surface, and thus to reduce the cost of the displays.

Advantageously, the proposed system and method make it possible to improve the viewing of the user while reducing the consumption of electrical energy by virtue of the management of the lighting/darkening of the display surfaces according to the direction of the user's gaze.

The invention claimed is:

1. A display system for a passenger compartment of a motor vehicle, comprising a number N of activatable display surfaces, each display surface being activatable by a lighting control of at least one associated lighting unit, and a programmable electronic device configured to control a display on each display surface, the programmable electronic device comprising a processor, wherein the processor is configured to execute, at a given rate:

a module for receiving a number P greater than 1 of digital images to be displayed at a given instant, said P digital images to be displayed being provided by at least two distinct sources;

a module for combining the P digital images to be displayed at the given instant into a single full digital image, the combining comprising analyzing the P digital images to be displayed, and for each digital image to be displayed, determining a ratio of change of size and applying said ratio;

in the case where the number N of activatable display surfaces is greater than 1, a module for dividing said full digital image into a number M less than or equal to N of digital sub-images to be displayed, each of the M digital sub-images to be displayed being intended to be displayed on a corresponding activatable display surface, and a module for controlling the display of each of the digital sub-images on the corresponding activatable display surface, wherein the module for dividing said full digital image into a number M less than or equal to N of digital sub-images is configured to implement a semantic image analysis to determine at least one low-entropy area, the dividing of the full digital image into M sub-images being carried out in said low-entropy area, and wherein the low-entropy area is defined by a number of contiguous pixels with fixed values or with values having a deviation less than a pre-defined threshold value between two successive images of a plurality of semantically analyzed consecutive images.

2. The display system according to claim 1, further comprising a unit for detecting a direction of the gaze of a user present in the passenger compartment of the motor vehicle, wherein the processor is further configured to, depending on the direction of the gaze of the user, implement a module for determining a main display area or a main display surface.

3. The display system according to claim 2, wherein the processor is configured to control an increase in illumination of said main display area or surface and a decrease in illumination of the other display areas or surfaces.

4. The display system according to claim 1, wherein the processor is configured to implement processing of changing dimensions and/or resolution of digital images, in order to form a full digital image with predetermined dimensions and resolution.

5. The display system according to claim 1, wherein, in the case where the number N of activatable display surfaces is equal to 1, the control module is configured to control the display of the full digital image on the display surface.

6. A display method for a passenger compartment of a motor vehicle, implemented by a processor of a programmable electronic device of a display system for a motor vehicle passenger compartment, comprising a number N of activatable display surfaces, each display surface being activatable by a lighting control of at least one associated lighting unit, wherein the method comprises:

receiving a number P greater than 1 of digital images to be displayed at a given instant, said digital images to be displayed being provided by at least two distinct sources, combining the P digital images to be displayed at the given instant into a single full digital image, the combining comprising: analyzing the P digital images, and for each digital image to be displayed, determining a ratio of change of size and applying said ratio;

in the case where the number N of activatable display surfaces is greater than 1, dividing said full digital image into a number less than or equal to N of digital sub-images to be displayed, each of the digital sub-images to be displayed being intended to be displayed on a corresponding activatable display surface, and controlling the display of each of the digital sub-images on the corresponding activatable display surface, wherein the step of dividing said full digital image into a number less than or equal to N of digital sub-images includes implementing a semantic image analysis to determine at least one low-entropy area, the dividing of the full digital image into sub-images being carried out in said low-entropy area, and wherein the step of implementing the semantic image analysis includes semantically analyzing a plurality of consecutive images to determine the at least one low-entropy area as a number of contiguous pixels with fixed values or with values having a deviation less than a pre-defined threshold value between two successive images.

7. The method according to claim 6, further comprising obtaining a direction of the gaze of a user present in the passenger compartment of the motor vehicle, determining a main display area or a main display surface based on the direction of the user's gaze, and adjusting the illumination of said main display area or surface.

8. A non-transitory, computer-readable medium comprising software instructions which, when executed by a programmable electronic device, implement the method according to claim 6.

9. The display system according to claim 1, wherein the module for dividing the full digital image into a number M less than or equal to N of digital sub-images to be displayed takes into account the activatable display surface size of each of the activatable display surfaces.

10. The display system according to claim 1, wherein the number P of digital images varies between two separate time instants.

11. The display system according to claim 1, wherein the combining further comprises concatenating the P digital images to be displayed in a predetermined order, said order depending on the image sources.

12. The display system according to claim 5, wherein the full image resolution is updated for compatibility with the display surface.

* * * * *